United States Patent
Nishibayashi et al.

(10) Patent No.: US 8,901,876 B2
(45) Date of Patent: Dec. 2, 2014

(54) CHARGE/DISCHARGE DETERMINING APPARATUS AND COMPUTER-READABLE MEDIUM

(75) Inventors: Yasuyuki Nishibayashi, Kawasaki (JP); Kotaro Ise, Kawasaki (JP); Keiichi Teramoto, Tokyo (JP); Takahisa Wada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 384 days.

(21) Appl. No.: 13/428,634

(22) Filed: Mar. 23, 2012

(65) Prior Publication Data
US 2012/0249048 A1 Oct. 4, 2012

(30) Foreign Application Priority Data

Mar. 28, 2011 (JP) ................................. 2011-069145

(51) Int. Cl.
H02J 7/00 (2006.01)
H02J 3/32 (2006.01)
H02J 3/38 (2006.01)
H02J 13/00 (2006.01)
H02J 3/46 (2006.01)
H01M 10/48 (2006.01)

(52) U.S. Cl.
CPC .............. *H01M 10/482* (2013.01); *Y02E 40/72* (2013.01); *H02J 3/32* (2013.01); *Y02E 60/722* (2013.01); *Y04S 10/123* (2013.01); *Y02E 10/566* (2013.01); *Y02E 70/30* (2013.01); *H02J 3/383* (2013.01); *Y02E 10/563* (2013.01); *H02J 13/0055* (2013.01); *H02J 3/46* (2013.01); *Y04S 10/14* (2013.01)
USPC ........................................................ 320/101

(58) Field of Classification Search
CPC .......... H02J 7/35; H02J 7/3555; Y02E 60/12; H01M 10/465; H01M 16/006
USPC ........................................................ 320/101
See application file for complete search history.

(56) References Cited

U.S. PATENT DOCUMENTS 6,639,383 B2 10/2003 Nelson et al.
2004/0207366 A1* 10/2004 Sung .............................. 320/140
(Continued)

FOREIGN PATENT DOCUMENTS

| JP | 2007-110809 | 4/2007 |
| JP | 2008-067418 | 3/2008 |
| JP | 4347277 | 7/2009 |
| WO | WO 2009/157342 A1 | 12/2009 |

OTHER PUBLICATIONS

Notification of the First Office Action issued by the State Intellectual Property Office of the People's Republic of China on Jan. 13, 2014, for Chinese Patent Application No. 20121008587.3, and English-language translation thereof.

(Continued)

*Primary Examiner* — Arun Williams
(74) *Attorney, Agent, or Firm* — Finnegan, Henderson, Farabow, Garrett & Dunner, L.L.P.

(57) ABSTRACT

There is provided a charge/discharge determining apparatus for managing a natural energy power generation facility, a power plant and a plurality of batteries in an electrical power system. The apparatus includes: a system information acquiring section configured to acquire an actual value of natural energy power that is supplied from the natural energy power generation facility to the electrical power system; a battery information acquiring section configured to acquire battery electric energy information from the respective batteries, wherein the battery electric energy information indicates charge/discharge electric energies of the respective batteries which can be discharged from or charged in the respective batteries; and a determining section configured to determine at least one battery to be charged/discharged from among the plurality of batteries, wherein when an absolute value of a difference between the actual value and a predicted value of the natural energy power is larger than a threshold value.

11 Claims, 24 Drawing Sheets

(56) References Cited

U.S. PATENT DOCUMENTS

| | | | |
|---|---|---|---|
| 2005/0006958 A1* | 1/2005 | Dubovsky | 307/64 |
| 2005/0099138 A1* | 5/2005 | Wilhelm | 315/209 R |
| 2008/0217998 A1* | 9/2008 | Parmley | 307/65 |
| 2009/0072788 A1 | 3/2009 | Delaille et al. | |
| 2010/0217453 A1 | 8/2010 | Itoh et al. | |
| 2010/0264732 A1* | 10/2010 | Beck | 307/24 |
| 2011/0133552 A1* | 6/2011 | Binder et al. | 307/22 |
| 2011/0304295 A1* | 12/2011 | McNally | 320/101 |

OTHER PUBLICATIONS

Notification of Reasons for Refusal issued by the Japanese Patent Office on Sep. 12, 2014, for Japanese Patent Application No. 2011-069145, and English-language translation thereof.

Notification of the Second Office Action issued by the State Intellectual Property Office of the People's Republic of China on Jul. 23, 2014, for Chinese Patent Application No. 201210085287.3, and English-language translation thereof.

* cited by examiner

FIG. 6

| TCP/IP HEADER | IDENTIFIER | REQUEST DISCHARGE VOLTAGE | REQUEST DISCHARGE CURRENT | REQUEST DISCHARGE TIME |

FIG. 11

| TCP/IP HEADER | IDENTIFIER | RATED CAPACITY | RATED VOLTAGE | MAXIMUM CHARGING CURRENT | MAXIMUM DISCHARGE CURRENT | CHARGING FACTOR |

FIG. 20

| TCP/IP HEADER | IDENTIFIER | UPPER LIMIT OPTIMUM CHARGING FACTOR | LOWER LIMIT OPTIMUM CHARGING FACTOR |

*FIG. 23*

| BATTERY SYSTEM | BEFORE DISCHARGE | AFTER DISCHARGE | DETERMINATION |
|---|---|---|---|
| BATTERY SYSTEM A | INSIDE | INSIDE | ○ |
| BATTERY SYSTEM B | INSIDE | OUTSIDE | × |
| BATTERY SYSTEM C | OUTSIDE | OUTSIDE | × |

FIG. 24

| TCP/IP HEADER | IDENTIFIER | STORABLE POWER (WITHIN OPTIMUM SOC RANGE) | CHARGEABLE TIME (WITHIN OPTIMUM SOC RANGE) | AVAILABLE POWER (WITHIN OPTIMUM SOC RANGE) | DISCHARGEABLE TIME (WITHIN OPTIMUM SOC RANGE) |
|---|---|---|---|---|---|

# CHARGE/DISCHARGE DETERMINING APPARATUS AND COMPUTER-READABLE MEDIUM

This application claims priority from Japanese Patent Application No. 2011-069145, filed on Mar. 28, 2011, the entire contents of which are hereby incorporated by reference.

BACKGROUND

1. Field

Embodiments described herein relate to a charge/discharge determining apparatus and computer-readable medium.

2. Description of the Related Art

In recent years, various kinds of natural energy have come to serve as major power supply sources like power plants.

However, the output power of natural energy varies to a large extent. For example, the generated power is very low when the weather is bad (in the case of photovoltaic power generation) or when no wind blows (in the case of wind power generation). When the power supplied from natural energy power supply sources drops rapidly, the actual power supply amount of a power network becomes much smaller than a planned value.

In such a case, to increase the actual power supply amount to the planned value, it is necessary to change the power supply amount of a power plant via a power supply command center of an electric power company. To change the power supply amount of the power plant, it is necessary to change the turbine rotation speed. However, it takes a certain time from issuance of a rotation change command to establishment of a new turbine rotation speed. The actual power supply amount is smaller than the planned value during such a transition period, possibly leading to a power failure.

To prevent such an event, the power decrease should be compensated for by power that is supplied from a battery system.

Where plural kinds of battery systems exist, the individual systems are different from each other in residual electric energy. Therefore, for example, the residual electric energy of a selected battery system may be lower than electric energy that is necessary to compensate for the power decrease until the turbine rotation speed reaches the new value. That is, even if switching is made to a battery system, a power failure or the like may still occur. Thus, the power network remains unstable.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention:

FIG. 6 shows an example communication message of a discharge instruction in the first embodiment;

FIG. 11 shows an example communication message containing batter information in the first embodiment;

FIG. 20 shows an example communication message in a second embodiment, which is sent from each battery system to a charge/discharge determining apparatus and indicates an optimum charging factor range;

FIG. 23 shows whether charging factors before a discharge of each of the battery systems shown in FIG. 3 are within its optimum changing factor range in the second embodiment; and FIG. 24 shows an example communication message containing battery information which is sent from each battery system in a modification of the second embodiment.

DETAILED DESCRIPTION

Figure 1:
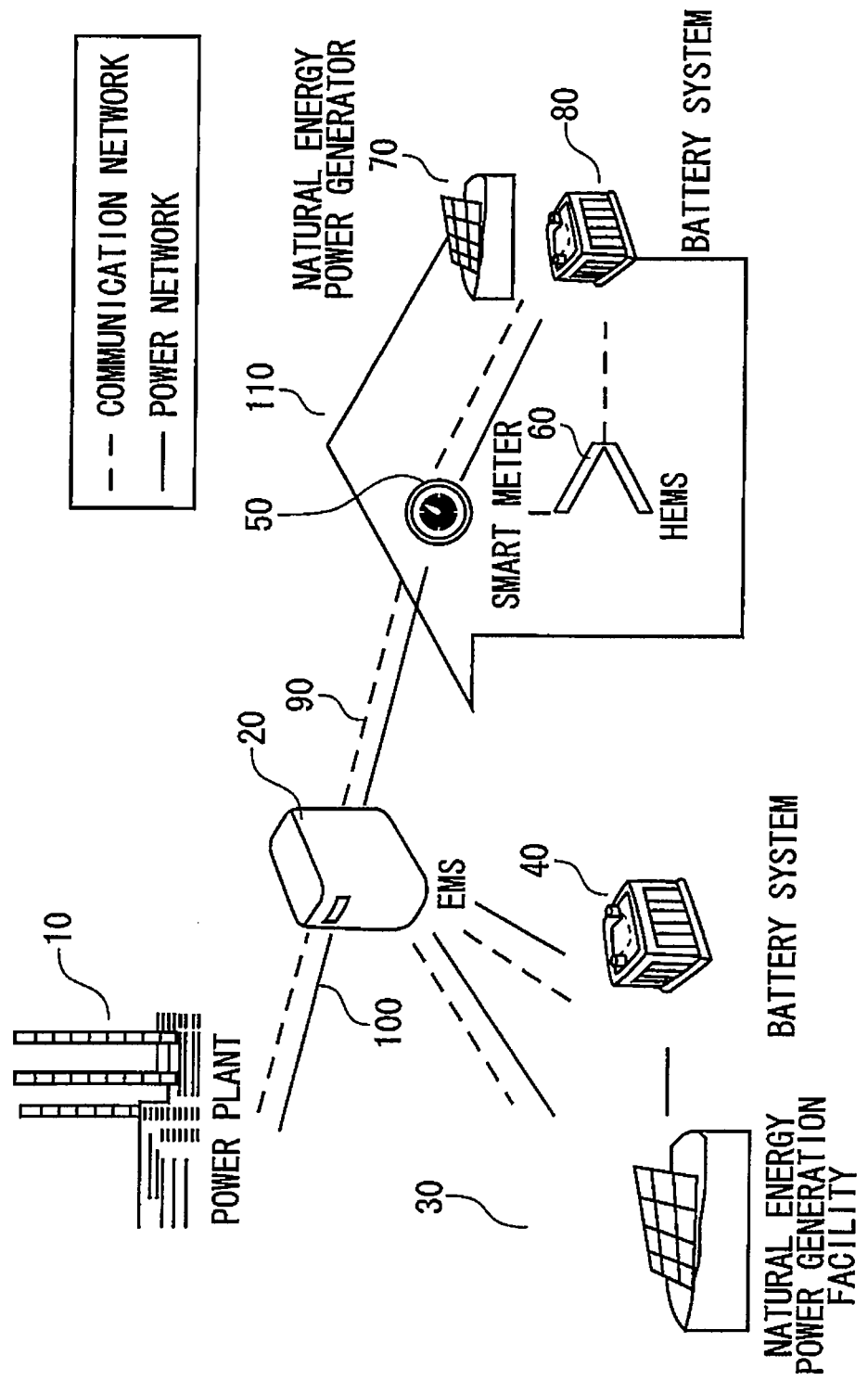
FIG. 1 shows a system according to a first embodiment.

Embodiments of the present invention will be hereinafter described with reference to the drawings. The same units, sections, or the like in the drawings will be given the same reference symbol and will not be described redundantly.

In one embodiment, there is provided a charge/discharge determining apparatus for managing a natural energy power generation facility, a power plant and a plurality of batteries in an electrical power system. The apparatus includes: a system information acquiring section configured to acquire an actual value of natural energy power that is supplied from the natural energy power generation facility to the electrical power system; a battery information acquiring section configured to acquire battery electric energy information from the respective batteries, wherein the battery electric energy information indicates charge/discharge electric energies of the respective batteries which can be discharged from or charged in the respective batteries; and a determining section configured to determine at least one battery to be charged/discharged from among the plurality of batteries, wherein when an absolute value of a difference between the actual value and a predicted value of the natural energy power is larger than a threshold value. The determining section is configured to: (a) instruct the power plant to change plant power that is supplied from the power plant to the electrical power system; (b) compare excess or shortage electric energy that is calculated from a delay time required for changing the plant power and the difference between the actual value and the predicted value of the natural energy power, with the charge/discharge electric energies of the respective batteries; (c) select at least one battery having a charge/discharge electric energy that is larger than the excess or shortage electric energy; and (d) determine the selected battery as a battery to be charged/discharged.

Embodiment 1

FIG. 1 shows a system according to a first embodiment of the invention.

The system according to the first embodiment includes a power plant (power supply command center) 10, an EMS (energy management system) 20, a natural energy power generation facility 30, a battery system 40, and a house 110. The house is equipped with a smart meter 50, an HEM (home energy management system) 60, a natural energy power generator 70, and a battery system 80.

The power plant 10, the EMS 20, the natural energy power generation facility 30, the battery system 40, and the home 110 are connected to each other by a power network 100 and a communication network 90.

In the house 110, the smart meter 50, the HEM 60, the natural energy power generator 70, and the battery system 80 are connected to each other by an intra-house part of the power network 100 and an intra-house part of the communication network 90.

The power plant (power supply command center) 10 generates power through thermal power generation or nuclear power generation, or the like, and supplies the generated power to the house 110 over the power network 100.

The natural energy power generation facility 30 generates power using natural energy such as wind energy or solar energy, and supplies the generated power to the house 110 over the power network 100. The system according to the embodiment can be operated efficiently by lowering the load of the power plant 10 because the natural energy power generation facility 30 supplies power.

Figure 2:
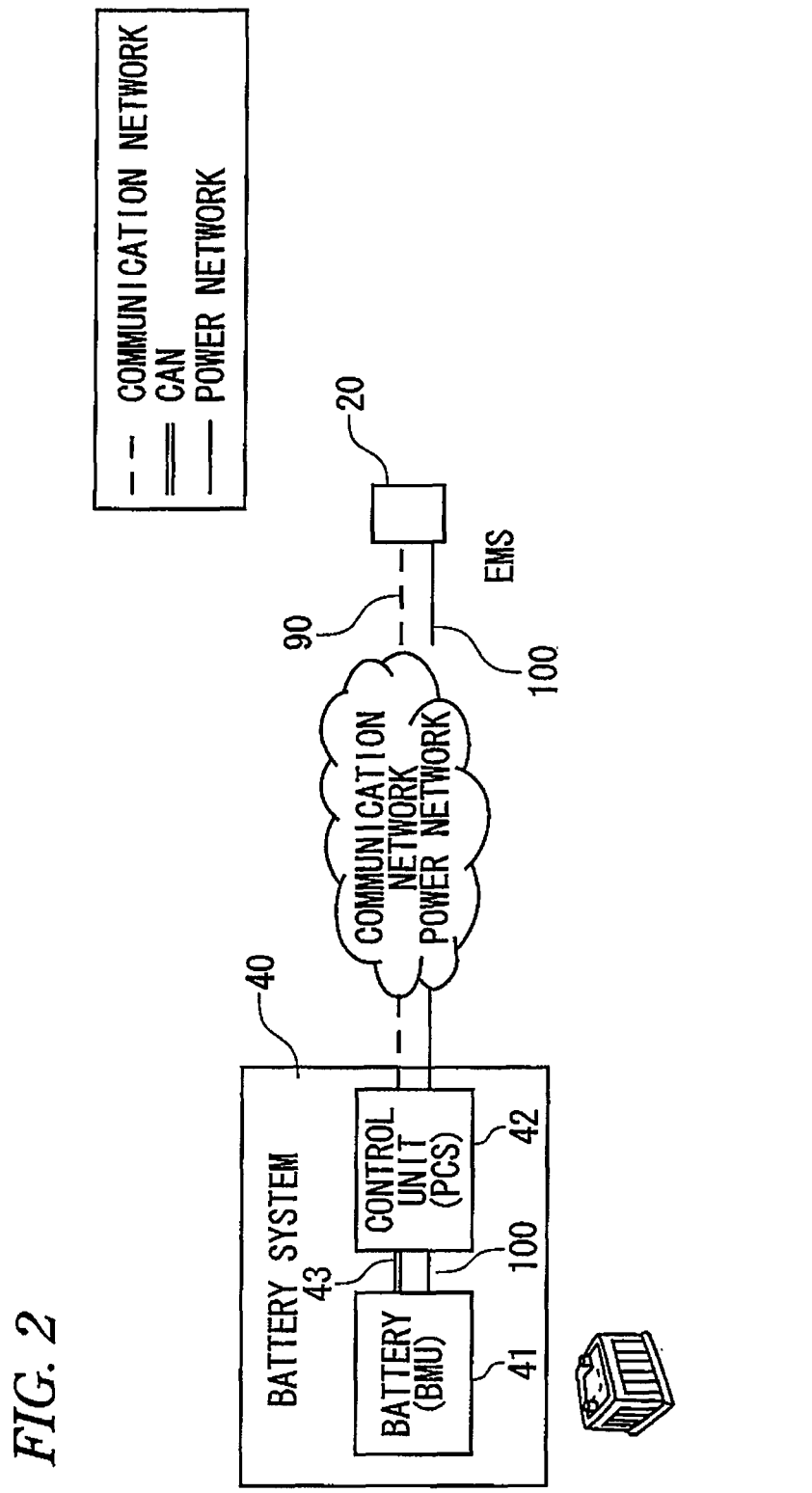
FIG. 2 is a block diagram of a battery system in the first embodiment.

The battery system 40 stores an excessive part of the power generated by the power plant 10 and the natural energy power generation facility 30. The excess power is a residual part, not supplied to power demand entities over the power network 100, of the power generated by the power plant 10 and the natural energy power generation facility 30. In the embodiment, the house 110 is an example power demand entity. The battery system 40 supplies power to the house 110 using the energy stored therein. As shown in FIG. 2, the battery system 40 is equipped with a battery (BMU: battery management unit) 41 and a control unit 42. The control unit 42 is equipped with a charge/discharge controller 420. The battery 41, the control unit 42, and the charge/discharge controller 420 will be described later.

The EMS 20 controls the entire system of FIG. 1. More specifically, the EMS 20 performs, via the power network 100 and the communication network 90, a control of power to be supplied from the power plant 10 and the natural energy power generation facility 30, a control of load power to be consumed in the house 110, and a control of excess power to be stored in the battery system 40.

The EMS 20 is a charge/discharge determining apparatus 200 (described later). If the absolute value of the difference between power (actual value) supplied from the power plant 10 and the natural energy power generation facility 30 and planned supply power (planned value) is larger than a prescribed threshold value, the charge/discharge determining apparatus 200 instructs the power plant 10 to increase the supply power and causes the battery system 40 to perform charging or discharging to store or supply power corresponding to the difference (if there are plural battery systems 40, the charge/discharge determining apparatus 200 selects one of them). A detailed configuration and functions of the charge/discharge determining apparatus 200 will be described later.

The smart meter 50, which is installed in the house 110, measures electric energy that is consumed in the house 110 and informs a management server of an electric power company of a measured electric energy value on a regular basis. The management server of the electric power company, which is generally called an MDMS (metering data management system), is not shown in FIG. 1. The EMS 20 cooperates with the MDMS to calculate a total electric energy consumption of the house 110.

The natural energy power generator 70, which is installed in the house 110, generates power using natural energy such as wind energy or solar energy. The generated power is consumed in the house 110 or stored in the battery system 80.

The battery system 80 is installed in the house 110. The battery system 80 is different from the battery system 40 in that the battery system 80 is installed in the house 110 but have the same functions as the latter. The battery system 80 stores part of power that is supplied from the power plant 10 and the natural energy power generation facility 30 or power generated by the natural energy power generator 70 of the house 110.

The HEMS 60 adjusts and controls the electric energy consumption in the house 110.

Although the system of FIG. 1 is provided with the single power plant 10, EMS 20, natural energy power generation facility 30, battery system 40, and house 110, each of them may be provided in plurality.

A system having plural battery systems 40 will be described below with reference to FIG. 3. The house 110 is omitted in FIG. 3.

Figure 4:
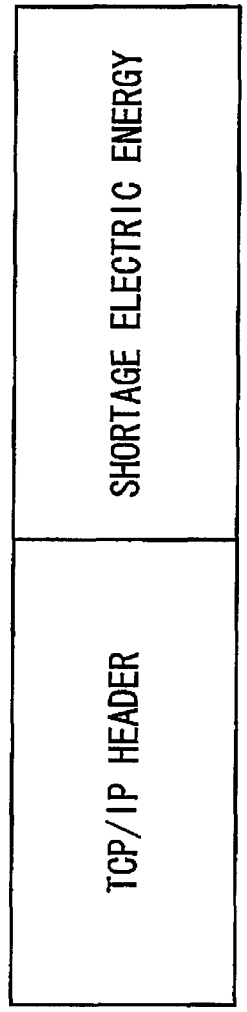
FIG. 4 shows an example communication message of an up-command in the first embodiment.
Figure 5:
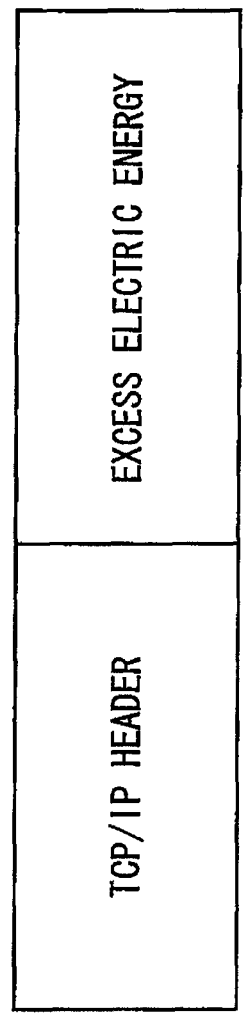
FIG. 5 shows an example communication message of a down-command in the first embodiment.

The main role of the EMS 20 is to prevent a power failure even when the power that is supplied from the natural energy power generation facility 30 varies. When detecting a shortage or excess of the power supplied from the natural energy power generation facility 30, the EMS 20 informs the power plant 10 of occurrence of a shortage or excess of supply power via the communication network 90. The EMS 20 sends a communication message of an up-command in the case of a shortage and sends a communication message of a down-command in the case of an excess. FIGS. 4 and 5 show example communication messages. When receiving the communication message, the power plant 10 starts a control of changing the turbine rotation speed according to whether the power supplied from the natural energy power generation facility 30 is in shortage or excessive. It takes a certain time for the power plant 10 to complete the change of the turbine rotation speed. During the transition period, the power that is supplied from the power plant 10 and the natural energy power generation facility 30 is lower or higher than a planned value, possibly resulting in a power failure. To prevent such a power failure, the battery systems 40 are caused to perform discharging or charging to compensate for the shortage power or excess power.

The EMS 20 is configured to send an up-command or a down-command to the power plant 10, select a battery system 40 capable of compensating for the shortage power or excess power for the time that is taken to change the power supplied from the power plant 10, and cause the selected battery system 40 to perform discharging or charging when the difference between the actual value and the planned value is large.

In general, the electric energy that can be supplied from or stored in each battery system 40 varies with time because a battery cell has a feature that the electric energy stored therein decreases due to natural discharge. Another reason is that the battery systems 40 may be used by companies that manage regional infrastructures and demand entities that use those infrastructures in addition to the electric power company.

Therefore, the EMS 20 monitors and recognizes the statuses of the batteries (BMUs) 41 of the battery systems 40 in real time via the communication network 90 and selects an eligible battery system 40 taking into consideration a time to be taken to change the power supplied from the power plant 10 and shortage power or excess power.

Upon determining the battery system 30 to perform discharging or charging, the EMS 20 sends a communication message of a charging/discharging start instruction to the determined battery system 40. When receiving the communication message, the control unit (PCS: power conditioning system) 42 of the battery system 40 immediately performs a control for assisting the stabilization of power supply by starting discharging or charging. FIGS. 6-9 show the structures of example communication messages that are sent from the EMS 20 to the battery system 40.

Figure 10:
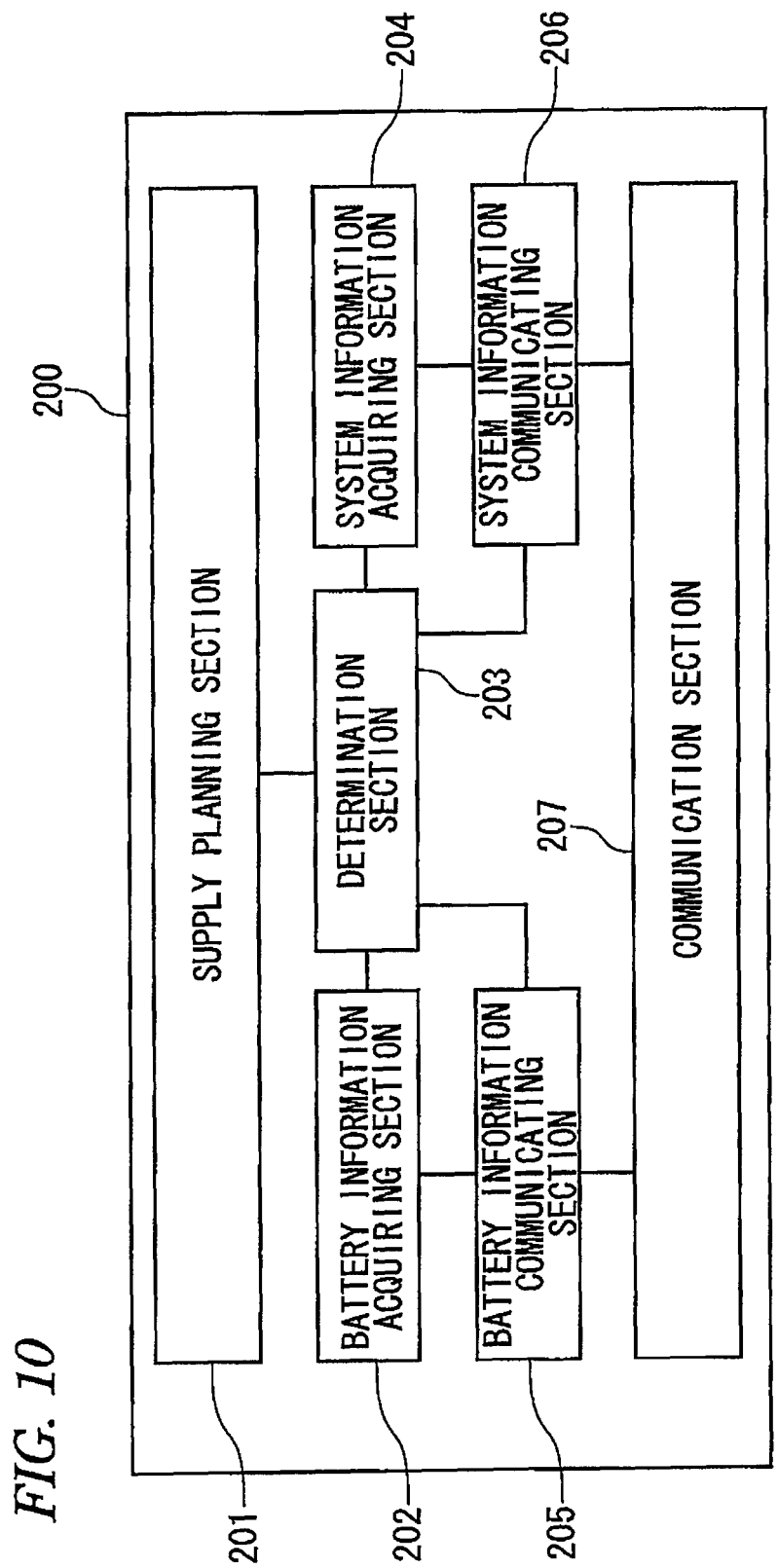
FIG. 10 is a block diagram of a charge/discharge determining apparatus according to the first embodiment.

FIG. 10 is a block diagram of an example charge/discharge determining apparatus 200 which operates as the EMS 20.

The charge/discharge determining apparatus 200 is equipped with a supply planning section 201, a system information acquiring section 204, a battery information acquiring section 202, a system information communicating section 206, a battery information communicating section 205, a communication section 207, and a determination section 203.

The supply planning section 201 manages planned values of power to be supplied from the power plant 10 and the natural energy power generation facility 30. The planned values of supply power are supply power values that are predicted to occur in the future. For example, planned values of supply power are calculated through prediction based on supply power values that occurred at the same time point in the past. Planned supply power values of the natural energy power generation facility 30 may be calculated according to weather forecasts. The supply planning section 201 also manages information necessary to calculate a delay time which is a time that it takes for the power plan 10 to change its supply power. The information necessary to calculate a delay time may be the delay time itself. For example, the delay time is a time that it takes for the power plan 10 to change the turbine rotation speed to change its supply power, and is, for example, a time from issuance of a rotation change instruction to completion of a reflection of the instruction.

The system information acquiring section 204 acquires, in real time, an actual value of power being supplied from the power plant 10 and the natural energy power generation facility 30 to the house 110. For example, the system information acquiring section 204 acquires an actual value of supply power by receiving communication messages from the power plant 10 and the natural energy power generation facility 30 over the communication network 90. Alternatively, the system information acquiring section 204 may acquire an actual value of supply power by calculating electric energy values based on frequency variations and voltage variations obtained through monitoring via the power network 100.

The system information communicating section 206 performs processing of receiving communication messages from the power plant 10 and the natural energy power generation facility 30. The communication messages may be such as to comply with a power information communication protocol such as IEC 61850. The system information communicating section 206 may communicate with the MDMS or smart meter 50 when, for example, planned values are determined or an actual value is acquired through a calculation in which a power consumption of the house 110 is taken into consideration. In this case, the system information communicating section communicates with the MDMS or smart meter 50 using a remote meter-reading communication protocol such as ANSI C12.19/22.

The battery information acquiring section 202 acquires, from each battery system 40, a communication message containing information (hereinafter referred to as battery information) relating to the battery (BMU) 41 of the battery system 40. For example, the battery information includes a rated capacity (unit: ampere hour (A·h)), a rated voltage (unit: volt (V)), maximum charge/discharge currents (unit: ampere (A)), and a charging factor SOC (unit: %). The battery information includes at least pieces of information that are necessary to calculate storable/available electric energy values, more specifically, a rated voltage, maximum charge/discharge currents, and a charging factor SOC. The charging factor SOC may be replaced by chargeable/dischargeable times which are calculated from the charging factor SOC.

Figure 12:
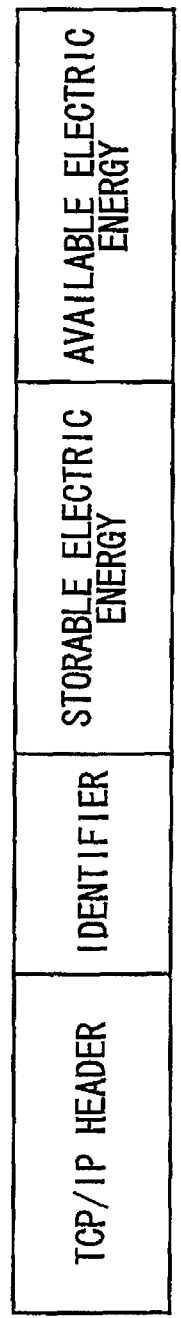
FIG. 12 shows another example communication message containing batter information in the first embodiment.

FIGS. 11 and 12 show example communication messages containing battery information that are generated by (the charge/discharge controller 420 of) each battery system 40 and sent to the charge/discharge determining apparatus 200.

The communication message containing battery information shown in FIG. 11 contains a TCP/IP (transmission control protocol/Internet protocol) header, an identifier, a rated capacity, a maximum charging current, a maximum discharge current, and a charging factor SOC.

The TCP/IP header is communication control information of the TCP/IP protocol which is a standard protocol of the Internet and an intranet. The identifier is information such as a manufacture number for unique identification of the battery system 40. The rated capacity (unit: ampere hour (A·h)) is a standard amount of electricity that can be output from a completely charged state under prescribed conditions (temperature, charging current, and final voltage). The rated voltage (unit: volt (V)) is voltage information to be used for indication of a battery voltage, and is called a nominal voltage in JIS D 0114 (electric vehicle terms (batteries)).

In the general constant current charging method, the current flowing into the battery cells of a battery pack varies linearly with a constant slope until the charging factor SOC (State of Charge) (described later) reaches a prescribed threshold value. A maximum value of such a current at the time of charging is defined as a maximum charging current (unit: ampere (A)) and a maximum value of such a current at the time of a discharge is defined as a maximum discharge current (unit: ampere (A)). The communication message containing battery information may further contain chargeable/dischargeable times (described later in detail) which are correlated with the charging factor SOC.

The battery information acquiring section 202 calculates, based on information contained in a communication message, power values (unit: watt (W)) or electric energy values (unit: watt hour (W·h)) that the battery system 40 can store or supply.

As shown in FIG. 12, the communication message containing battery information may contain storable/available power values or storable/available electric energy values. This corresponds to a case that the charge/discharge controller 420 of each battery system 40 calculates storable/available power values or storable/available electric energy values.

The battery information communicating section 205 performs processing of receiving a communication message containing battery information that is sent from the charge/discharge controller 420 of each battery system 40.

For example, the communication section 207 is implemented as a wired communication medium such as an optical fiber, a telephone line, or an Ethernet (registered trademark). The communication section 207 is not limited to a wired communication medium.

If the absolute value of the difference between the actual value and the planned value of supply power is larger than the threshold value, the determination section 203 sends an instruction message for changing the supply power to the power plant 10 and compares shortage electric energy or excess electric energy that is calculated from the difference between the actual value and the planned value and a delay time with the storable/available electric energy values of the respective battery systems 40. The determination section 203 determines, as a battery system 40 to perform discharging or charging, a battery system 40 whose storable/available electric energy is larger than the shortage electric energy or excess electric energy among the plural battery systems 40. The determination section 203 causes the determined battery system 40 to perform discharging or charging. The determination section 203 may determine a battery system 40 to perform discharging or charging based on magnitude relationships between the shortage electric energy or excess electric energy and the storable/available power values of the respective battery systems 40 and magnitude relationships between the delay time and the chargeable/dischargeable times.

FIGS. 4 and 5 show example instruction messages for changing the supply power that are send from the charge/discharge determining apparatus 200 (EMS 20) to the power plant 10 (power supply command center). FIG. 4 shows a communication message of an up-command which contains a TCP/IP header and shortage electric energy (unit: watt hour (W·h)). FIG. 5 shows a communication message of a down-command which contains a TCP/IP header and an excess electric energy (unit: watt hour (W·h)).

As described above, when receiving the communication message of an up-command or down-command from the charge/discharge determining apparatus 200 (EMS 20), the power plant 10 starts a control of increasing the rotation speed of the turbine according to the shortage electric energy or decreasing the rotation speed of the turbine according to the excess electric energy.

FIGS. 6-9 show example communication messages as charge/discharge start instructions that the charge/discharge determining apparatus 200 (EMS 20) sends to the battery system 40 to cause it to perform charging or discharging.

FIG. 6 shows a communication message of a discharge instruction which contains a TCP/IP header, an identifier, a request discharge voltage, a request discharge current, and a request discharge time. The TCP/IP header and the identifier are the same as those of the communication messages shown in FIGS. 11 and 12. The request discharge voltage (unit: volt (V)) and the request discharge current (unit: ampere (A)) are set smaller than the rated voltage and the maximum discharge current, respectively. Request discharge electric energy (unit: watt hour (W·h)) can be calculated as a product of the request discharge voltage, the request discharge current, and a request discharge time (unit: hour (h)).

Figure 8:
FIG. 8 shows another example communication message of a discharge instruction in the first embodiment.

FIG. 8 shows a communication message that contains request discharge electric energy calculated by the charge/discharge determining apparatus 200 (EMS 20). Either of the communication messages of FIGS. 6 and 8 may be used when the invention is practiced.

Figure 7:
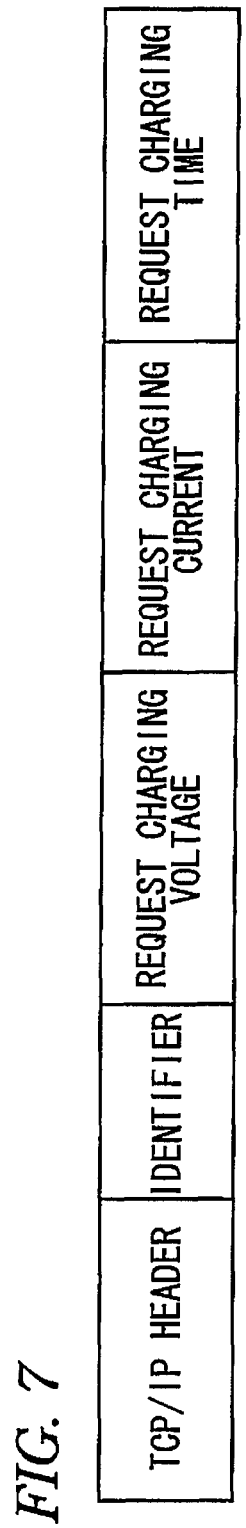
FIG. 7 shows an example communication message of a charging instruction in the first embodiment.

FIG. 7 shows a communication message of a charging instruction which contains a TCP/IP header, an identifier, a request charging voltage, a request charging current, and a request charging time. The request charging voltage (unit: volt (V)) and the request charging current (unit: ampere (A)) are set smaller than the rated voltage and the maximum charging current, respectively. Request charging electric energy (unit: watt hour (W·h)) can be calculated as a product of the request charging voltage, the request charging current, and a request charging time (unit: hour (h)).

Figure 9:
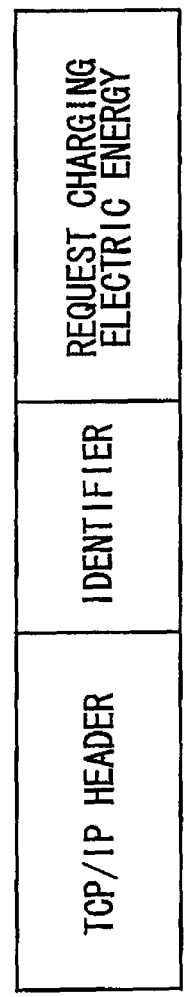
FIG. 9 shows an example communication message of a charging instruction in the first embodiment.

FIG. 9 shows a communication message that contains request charging electric energy calculated by the charge/discharge determining apparatus 200 (EMS 20). Either of the communication messages of FIGS. 7 and 9 may be used when the invention is practiced.

In communication messages containing the detailed information as shown in FIGS. 6 and 7, plural pieces of information including a request charge/discharge voltage and a request charge/discharge current may be described for each unit time (second, minute, or hour). For example, in the case of a charging instruction, pieces of detailed information may be specified in time series such as information-1 (70 V, 40 A, 1 minute), information-2 (50 V, 30 A, 1 minute) or the like. Either method may be employed because request charging electric energy is finally calculated. These communication messages are handled by a battery information communicating section 423, which operates as part of the charge/discharge controller 420, of the battery system 40 and the battery information communicating section 205 of the EMS 20 which operates as the charge/discharge determining apparatus 200.

FIG. 2 is a block diagram of each battery system 40.

Each battery system 40 is equipped with a battery (BMU) 41 and a control unit (PCS) 42.

The battery (BMU) 41 is equipped with a battery pack having plural battery cells and an internal processor which manages the state of the battery pack. The battery 41 stores or supplies power according to a charge/discharge instruction from the control unit (PCS) 42.

The battery 41 informs the control unit 42 of its battery information (a rated voltage, maximum charge/discharge currents, an SOC (state of charge, charging factor, an SOH (state of health, lifetime factor), etc.).

The control unit 42 has functions of the charge/discharge controller 420 (described later).

The control unit 42 performs a charge/discharge control on the battery 41 and exchanges information with it. For example, a CAN (controller area network) 43 is used for information communication between the battery 41 and the control unit 42. Alternatively, any of other communication media such as an Ethernet (registered trademark) may be used for such information communication.

The control unit 42 communicates with the EMS 20. The control unit 42 sends battery information of the battery 41 to the EMS 42 over the communication network 90, whereby the EMS 42 can be informed, in real time, of the status of the battery 41 which varies with the passage of time.

Capable of acquiring information indicating the status of each battery 41 over the communication network 90, the EMS 20 can recognize the status of each battery 41 properly. Thus, the EMS 20 can properly determine a battery system to perform charging or discharging.

Furthermore, the control unit 42 performs DC-AC conversion and suppression of voltage variation for power to be stored or supplied by the battery 41. Alternatively, DC-AC conversion and suppression of voltage variation may be performed by an external processor that is connected to the control unit 42.

Figure 13:
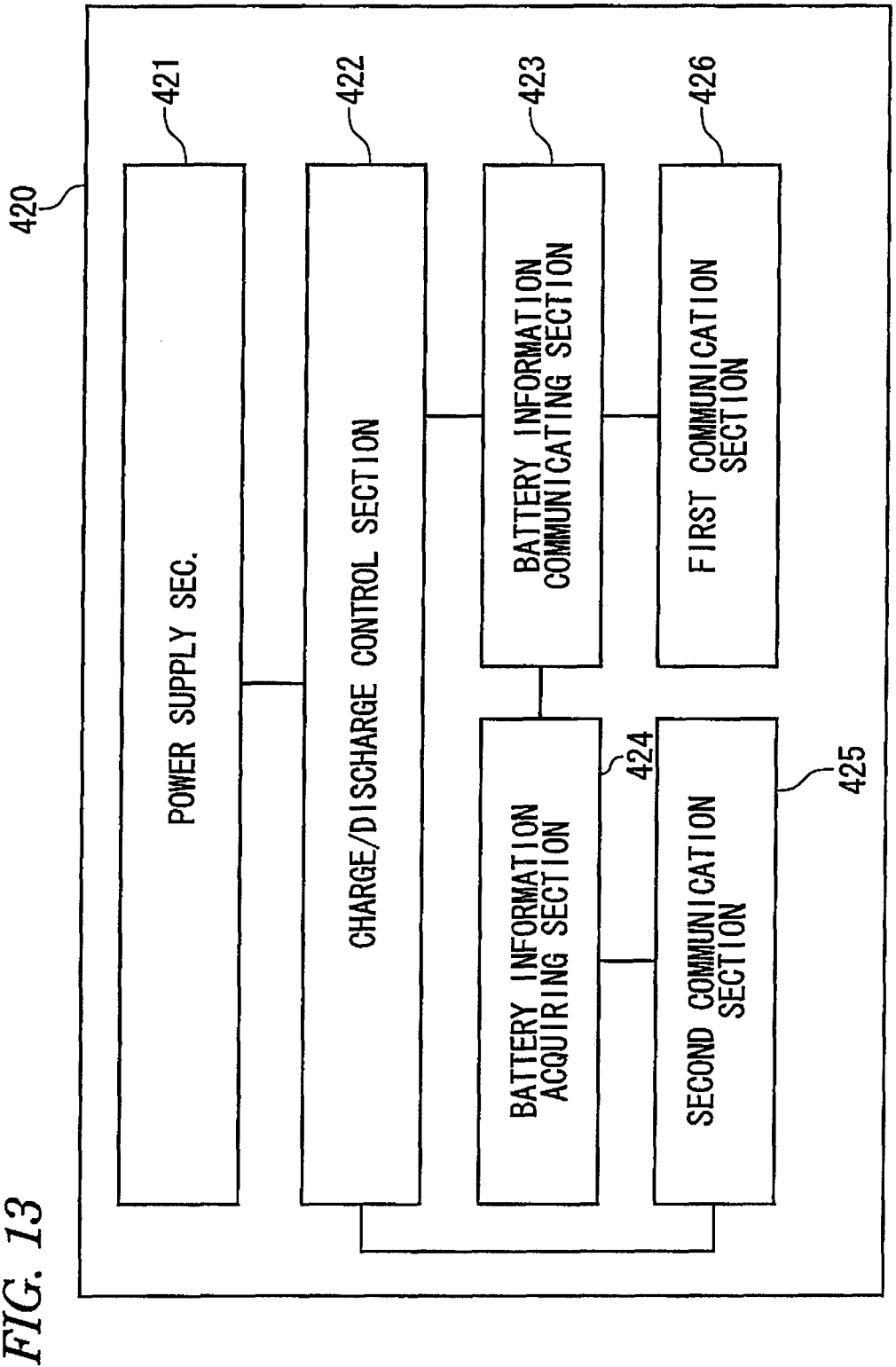
FIG. 13 is a block diagram of a charge/discharge controller according to the first embodiment.

FIG. 13 is a block diagram of the charge/discharge controller 420 according to the first embodiment.

The charge/discharge controller 420 is functions of the control unit 42.

The charge/discharge controller 420 sends battery information of the battery 41 to the charge/discharge determining apparatus 200 and performs a charge/discharge control on the battery 41 according to an instruction from the charge/discharge determining apparatus 200.

The charge/discharge controller 420 is equipped with a power supply section 421, a charge/discharge control section 422, a battery information acquiring section 424, a battery information communicating section 423, a first communication section 426, and a second communication section 425.

The second communication section 425 is an interface for communication with the battery 41 that complies with CAN which is a standard interface standard for batteries. Alternatively, the interface may be a communication medium such as an Ethernet (registered trademark).

The battery information acquiring section 424 acquires battery information of the battery 41 via the second communication section 425. The battery information acquiring section 424 acquires at least pieces of information (maximum charge/discharge currents, rated voltage, and SOC) that are necessary for calculation of storable/available electric energy values. Example pieces of battery information are pieces of characteristic information (rated voltage, rated capacity, charge/discharge final voltages, upper limit temperature, lower limit temperature, maximum charge/discharge currents, etc.) which are fixed pieces of information unique to the battery 41. Other example pieces of battery information are pieces of state information (SOH, SOC, charge/discharge voltages, and charge/discharge currents) which are variable pieces of information and vary with the passage of time while the battery 41 is in operation. Whereas the pieces of characteristic information do not vary with time, the pieces of state information do. The battery information acquiring section 424 acquires at least variable pieces of information on a regular basis.

Figure 14:
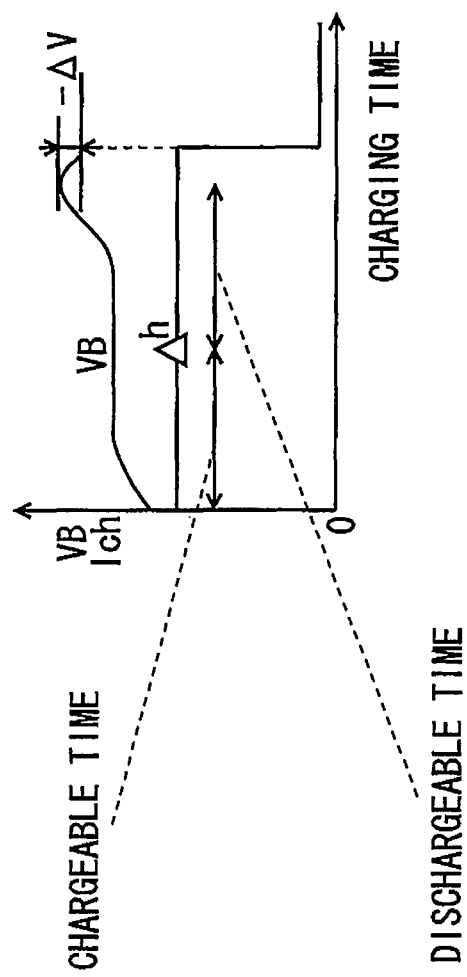
FIG. 14 is a graph showing how chargeable/dischargeable times are determined from a charging factor (SOC) curve.

The battery information acquiring section 424 calculates chargeable/dischargeable times (unit: hour (h)) based on the acquired SOC using a graph shown in FIG. 14, for example. In the constant current charging method which is a general charging method, the input/output current of the battery 41 is constant until the SOC reached a prescribed threshold value. This constant current is a maximum charge/discharge current which is one piece of characteristic information of the battery 41. In the constant current charging method, the charging current becomes very small after the SOC exceeds the threshold value.

For example, as in the example of FIG. 14, assume that the SOC range where the input/output current Ich of the battery 41 is kept at the maximum charge/discharge current is from 0% to 90% and that the SOC is currently at 50% (indicated by symbol "Δ" in FIG. 14). A time (chargeable time) that is necessary to perform charging of the remaining 40% of SOC can be estimated as indicated by a solid-line double arrow shown in FIG. 14. On the same assumptions, a time (dischargeable time) that is necessary to perform a discharge of 50% can also be estimated. The SOC range where the input/output current Ich of the battery 41 is kept at the maximum charge/discharge current depends on the battery type and is not necessarily bounded by 0% or 90%. The charging/discharging controller 420 can calculate chargeable/dischargeable times (on the horizontal axis of the graph) and maximum charge/discharge currents necessary for charging and a discharge (on the vertical axis of the graph) by acquiring an SOC value, because these parameters are correlated with the SOC.

The battery information acquiring section 424 may calculate storable/available electric energy values (unit: watt hour (W·h) which are the products of the calculated chargeable/dischargeable times, the rated voltage, and the maximum charge/discharge currents, respectively. The battery information acquiring section 424 may also calculate storable/available power values.

The battery information communicating section 423 generates a communication message containing battery information of the battery 41 and sends it to the charge/discharge determining apparatus 200 via the first communication section 426. For example, as shown in FIG. 11, the communication message contains a rated voltage, maximum charge/discharge currents, and an SOC (charging factor). The charge/discharge determining apparatus 200 calculates chargeable/dischargeable times based on the SOC. The charge/discharge determining apparatus 200 calculates storable/available electric energy values based on the rated voltage, the maximum charge/discharge currents, and the chargeable/dischargeable times, respectively.

For another example, as shown in FIG. 12, the communication message may contain storable/available electric energy values or storable/available power values. In these cases, the charge/discharge controller 420 calculates the storable/available electric energy values or the storable/available power values.

The battery information communicating section 423 sends such a communication message to the charge/discharge determining apparatus 200 cyclically rather than only once or in response to a request from the charge/discharge determining apparatus 200. This is because battery cells have a feature that they discharge naturally and hence the SOC and the storable/available electric energy values which are calculated based on the SOC vary with the passage of time.

The first communication section 426 is connected to the charge/discharge determining apparatus 200 by the communication network 90. For example, the first communication section 426 is a wired communication medium such as an optical fiber, a telephone line, or an Ethernet (registered trademark). Alternatively, the first communication section 426 may be a wireless communication medium.

If receiving, from the charge/discharge determining apparatus 200, a communication message that is an instruction to perform a charging or discharge control, the charge/discharge control section 422 instructs the power supply section 421 to perform a charging or discharge control on the battery 41.

The power supply section 421 performs a charging or discharge control on the battery 41 according to the instruction from the charge/discharge control section 422. The power supply section 421 performs DC-AC conversion, detection of a frequency of supply power, detection and suppression of voltage variation, etc.

Figure 3:
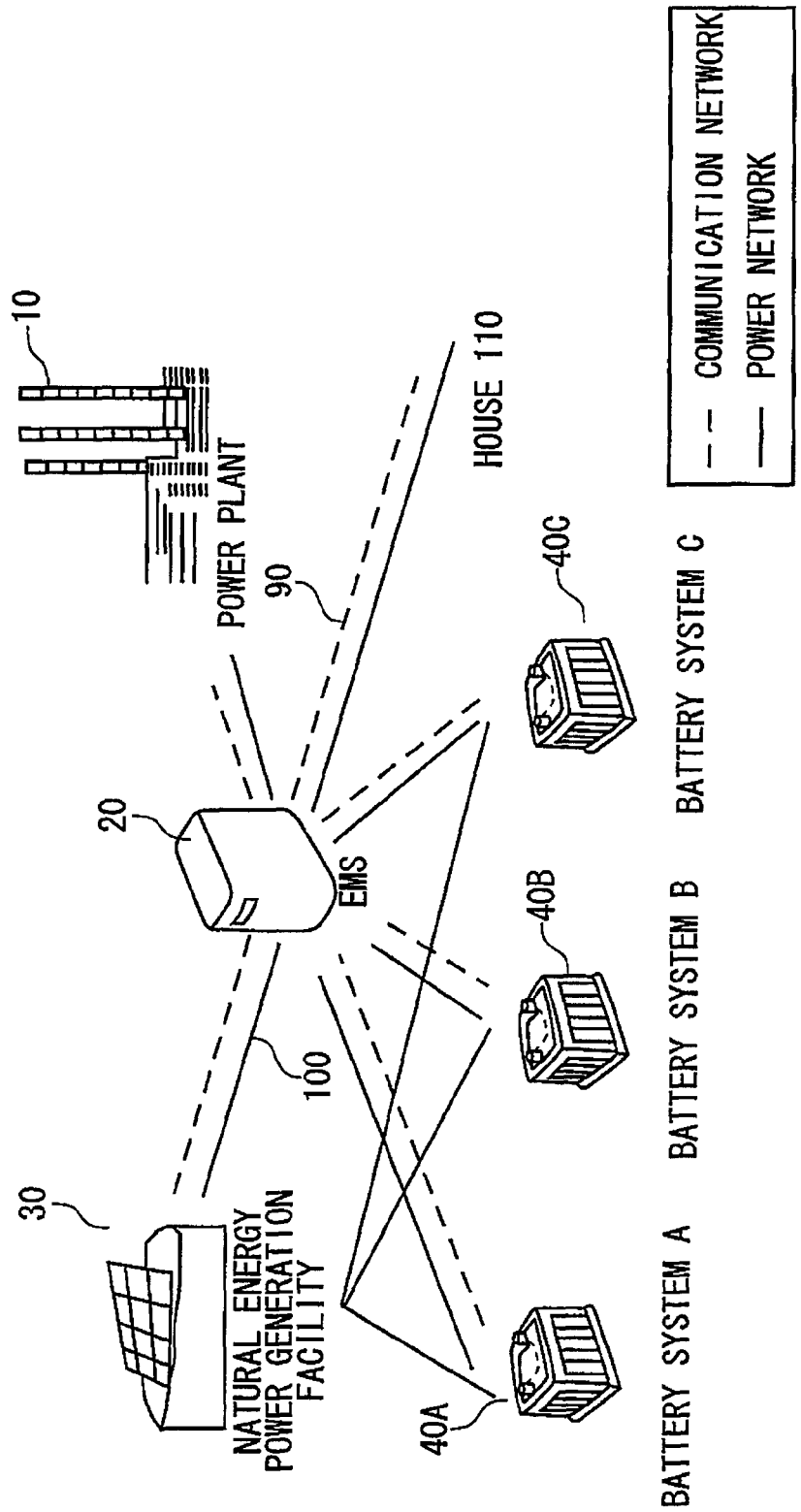
FIG. 3 shows another system according to a first embodiment which has plural battery systems.
Figure 15:
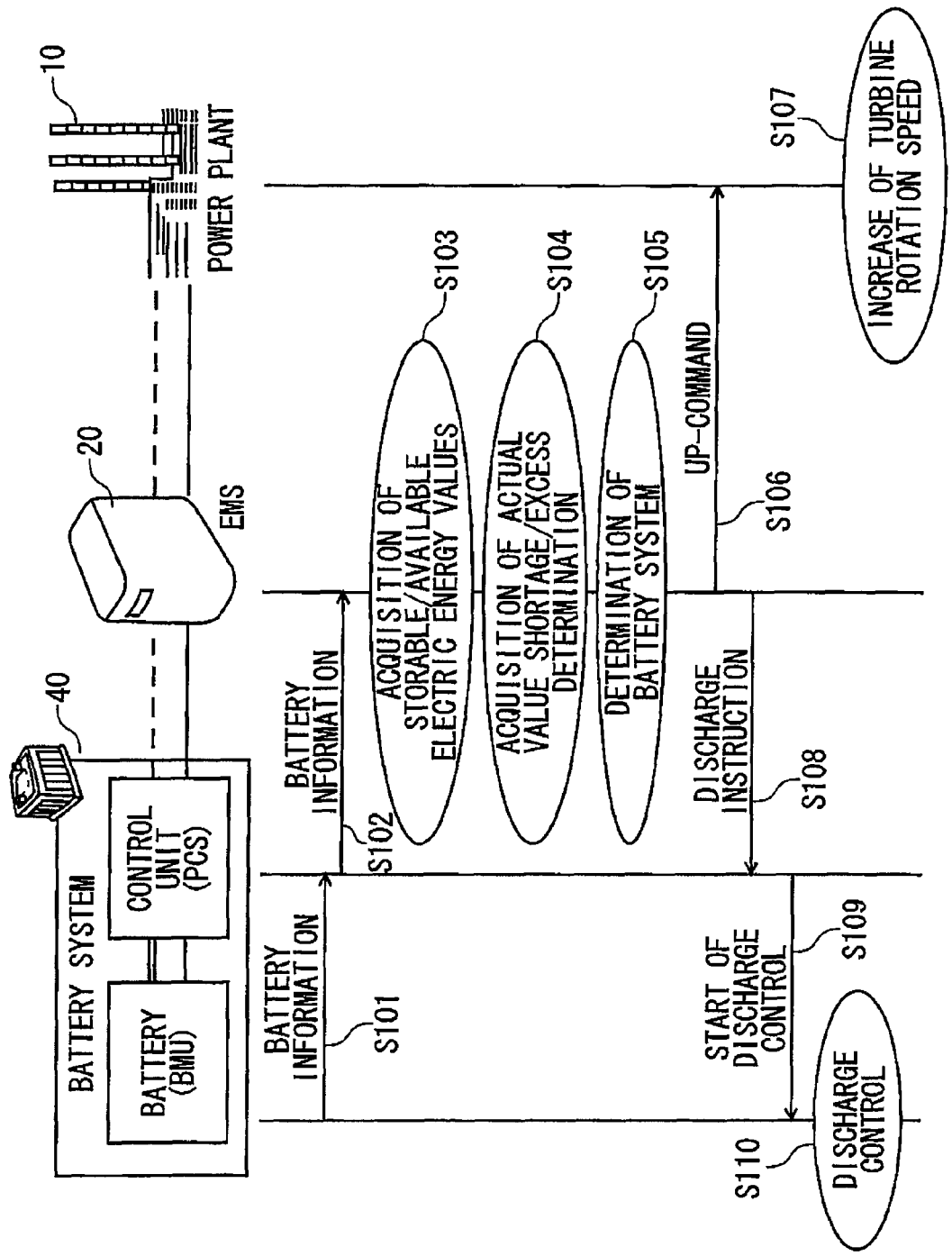
FIG. 15 is a sequence diagram showing how the system of FIG. 3 operates.

FIG. 15 is a sequence diagram showing how the system of FIG. 3 operates. Although the system of FIG. 3 is equipped with the three battery systems 40, the operation of one representative battery system 40 will be described. The natural energy power generation facility 30 is not shown in FIG. 15, either.

It is assumed that the charge/discharge determining apparatus 200 (EMS 20) has acquired planned values of supply power of the power plant 10 and the natural energy power generation facility 30 in advance.

First, at step S101, the control unit (PCS) 42 of each battery system 40 acquires battery information of the battery 41 via the CAN 43.

At step S102, the control unit (PCS) 42 generates a communication message relating to the battery information and sends it to the charge/discharge determining apparatus 200 (EMS 20) over the communication network 90.

At step S103, the charge/discharge determining apparatus 200 (EMS 20) calculates electric energy that can be stored in or supplied from each battery system 40 based on the communication message containing the battery information.

At step S104, the charge/discharge determining apparatus 200 (EMS 20) acquires an actual value of supply power of the power plant 10 and the natural energy power generation facility 30. If the absolute value of the difference between the actual value and a planned value is larger than a prescribed threshold value, the charge/discharge determining apparatus 200 (EMS 20) regards it as a power variation and makes a shortage/excess determination. The shortage/excess determination is made by determining whether or not the planned value minus the actual value is positive or negative. That is, a positive value means a power shortage and a negative value means a power excess.

At step S105, if detecting a power shortage or excess, the charge/discharge determining apparatus 200 (EMS 20) determines a battery system 40 that should be requested to perform charging or discharging by comparing the storable/available electric energy values of the respective battery systems 40 with electric energy that is calculated from an already acquired delay time for supply power change of the power plant 10 and the shortage power or excess power.

At step S106, the charge/discharge determining apparatus 200 (EMS 20) sends a communication message of an up-command or a down-command to the power plant 10. FIG. 15 shows a case that a communication message of an up-command is sent. At step S107, the boiler increases the turbine rotation speed to increase the supply power.

At step S108, the charge/discharge determining apparatus 200 (EMS 20) sends a communication message of a charge/discharge control instruction to the battery system 40 that was determined at step S105. FIG. 15 shows a case that a communication message of a discharge control instruction is sent.

At step S109, the control unit 42 of the battery system 40 analyzes the communication message that is sent from the charge/discharge determining apparatus 200 (EMS 20) and starts a charging or discharge control on the battery 41. FIG. 15 shows a case that a discharge control is started.

Where the battery 41 is subjected to the discharge control, the excess power is compensated for the delay time.

Upon passage of the delay time, the discharge control on the battery 41 is finished and the power plant 10 starts supplying power that has been increased by the shortage power.

Next, a detailed operation of the charge/discharge determining apparatus 200 will be described with reference to FIGS. 16 and 17.

Figure 17:
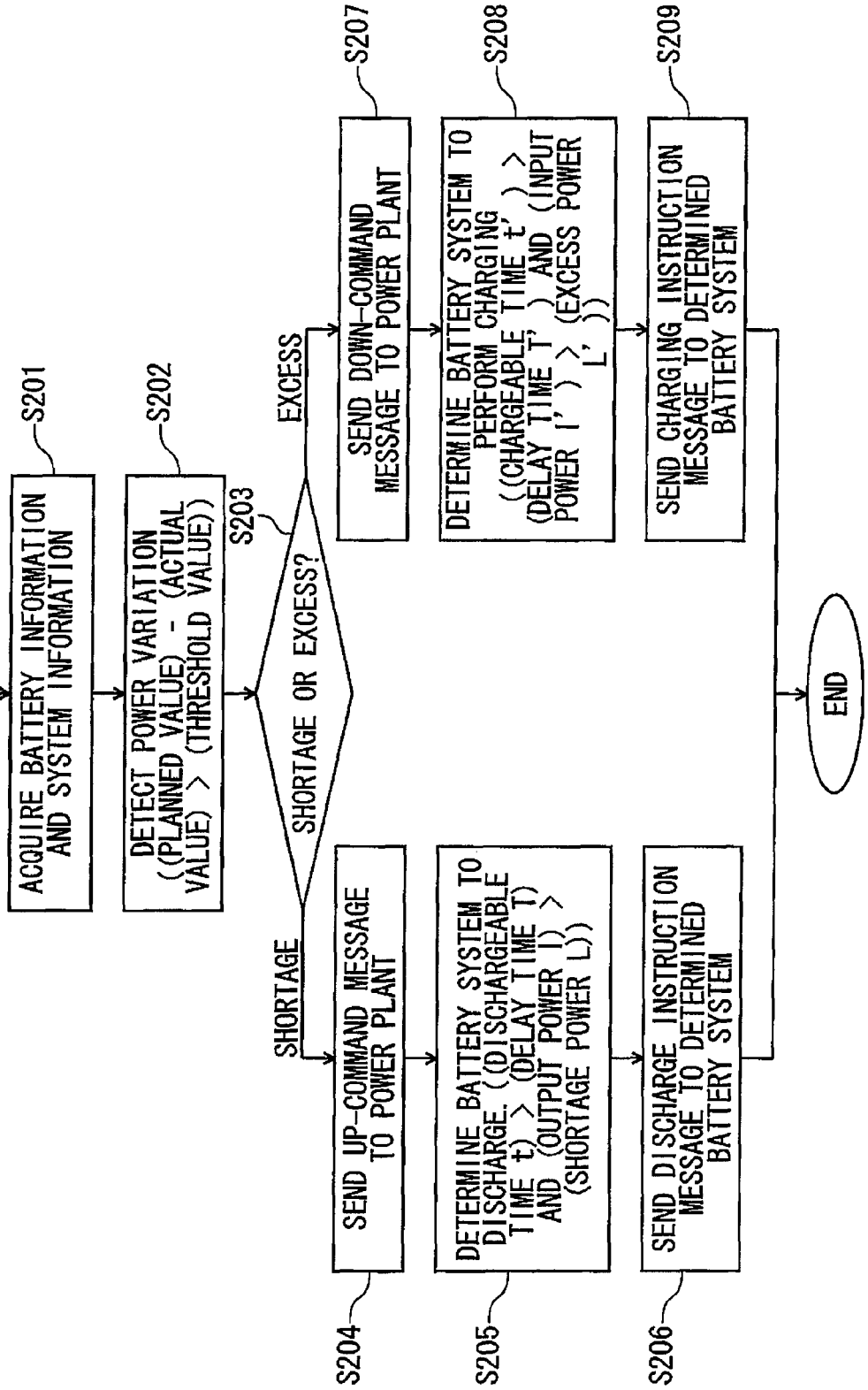
FIG. 17 is a flowchart of a process executed by the charge/discharge determining apparatus according to the first embodiment.

FIG. 17 is a flowchart of a process which is executed by the charge/discharge determining apparatus 200.

Figure 16:
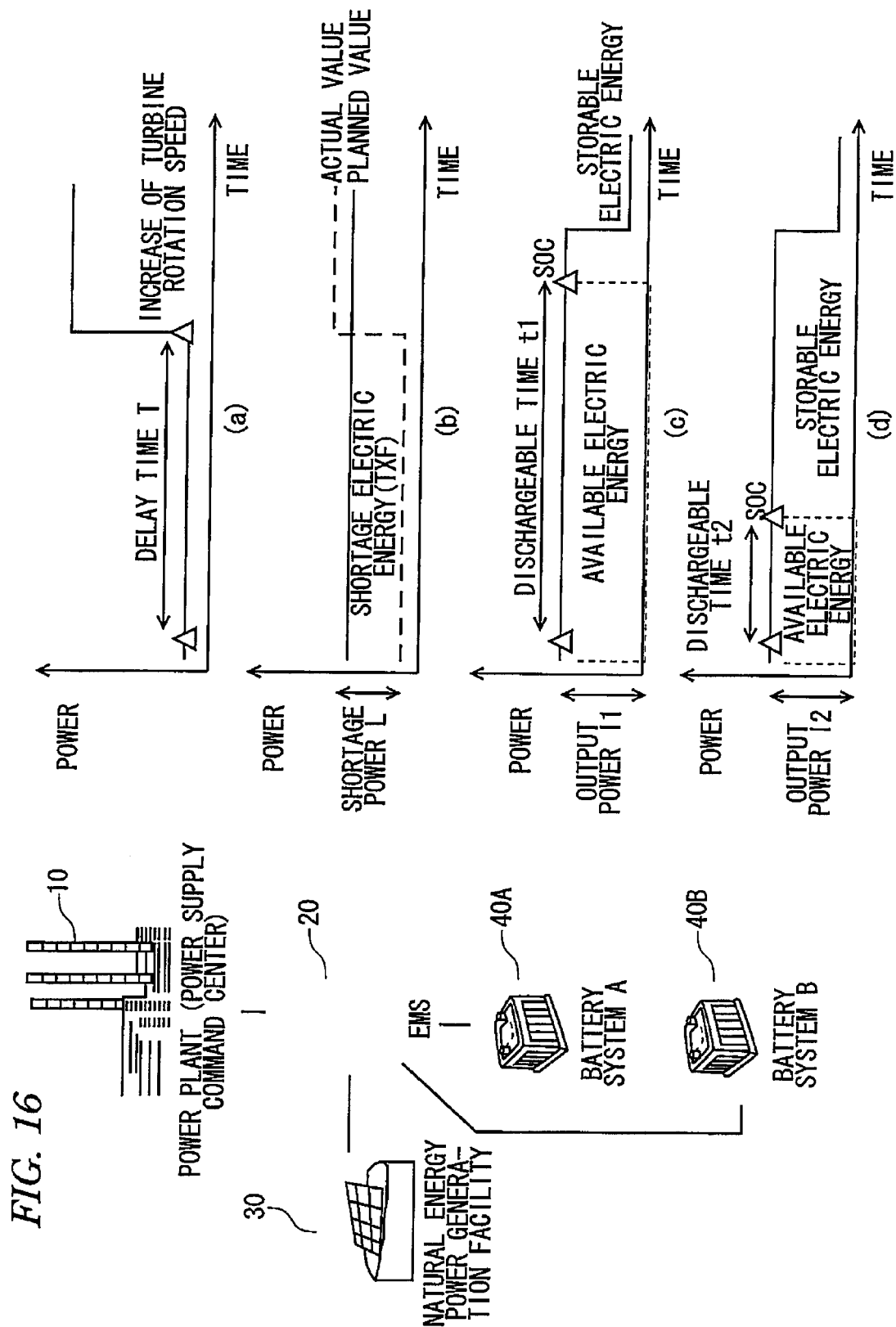
FIG. 16 shows a relationship between shortage electric energy and available electric energy in the system of FIG. 3.

FIG. 16 shows a relationship between shortage electric energy and available electric energy values in the system of FIG. 3.

Part (a) of FIG. 16 shows a delay time T (unit: hour (h)) that is taken to change the turbine rotation speed to change the supply power of the power plant 10.

Part (b) of FIG. 16 shows shortage electric power (unit: watt hour (W·h)) of the power plant 10 and the natural energy power generation facility 30. The shortage electric power is the product of the difference (shortage power L (unit: watt (W)) between a planned value (solid line) and an actual value (broken line) and the delay time T shown in part (a) of FIG. 16.

Parts (c) and (d) of FIG. 16 show storable/available electric energy values (unit: watt hour (W·h)) of the batter systems 40A and 40B, respectively. The storable/available electric energy is the product of the output power (unit: watt (W)) and the chargeable/dischargeable time (unit: hour). As shown in part (c) of FIG. 16, the battery system 40A has a dischargeable time t1 and output power I1 (during a discharge control) and hence its dischargeable electric energy is t1×I1. As shown in part (d) of FIG. 16, the battery system 40B has a dischargeable time t2 and output power I2 (during a discharge control) and hence its dischargeable electric energy is t2×I2.

How the charge/discharge determining apparatus 200 (EMS 20) operates with the system of FIG. 3 being in the state of FIG. 16 will be described with reference to FIG. 17.

First, at step S201, the charge/discharge determining apparatus 200 (EMS 20) acquires battery information from the battery systems 40 and also acquires system information (containing a planned value and an actual value of supply power and a delay time) of the power plant 10 and the natural energy power generation facility 30. Of the battery information and the system information, pieces of information that vary with the passage of time are acquired cyclically. On the other hand, it suffices that pieces of fixed information that do not vary with time be acquired only once.

If the absolute value of the difference between the planned value and the actual value of supply power is larger than a particular threshold value, at step S202 the charge/discharge determining apparatus 200 regards it as a power variation and moves to a shortage/excess determining step S203.

At step S203, if the planned value and the actual value are 100 kW and 80 kW, respectively, and the threshold value is 10 kW, the charge/discharge determining apparatus 200 determines that the supply power is in shortage. If the planned value and the actual value are 100 kW and 120 kW, respectively, and the threshold value is 10 kW, the charge/discharge determining apparatus 200 determines that the supply power is excessive.

As described above, the supply power is in shortage in the example of FIG. 16. If the supply power is in shortage, the process moves to step S204.

At step S204, the charge/discharge determining apparatus 200 sends, to the power plant 10, an up-command message for instructing the power plant 10 to increase the supply power.

At step S205, the charge/discharge determining apparatus 200 determines a battery system 40 to discharge. As shown in FIG. 16, the power plant 10 has the delay time T (i.e., a time that is taken to change the rotation speed to change the supply power) and the shortage power L (i.e., the difference between the planned value and the actual value of supply power). That is, the charge/discharge determining apparatus 200 determines, as a battery system 40 to discharge, a battery system 40 capable of supplying the shortage power L for the delay time L. In the example of FIG. 16, whereas the battery system 40A satisfies the conditions (dischargeable time t1)>(delay time T) and (output power I1)>(shortage power L), in the battery system 40B the dischargeable time t2 is shorter than the delay time T. Therefore, the charge/discharge determining apparatus 200 decides that the battery system 40A should be caused to discharge.

At step S206, the charge/discharge determining apparatus 200 sends a communication message of a discharge instruction to the battery system 40A. Upon receiving that communication message, the battery system 40A starts discharge processing and supplies power to the power network 90. For example, the battery system 40A supplies power to the house 110 over the power network 90.

Although the above description is directed to the discharge control (steps S204-S206) which is performed because the supply power is in shortage, a charging control (steps S207-209) can be performed in a similar manner when the supply power is excessive.

Next, a detailed operation of the charge/discharge controller 420 will be described with reference to FIG. 18.

Figure 18:
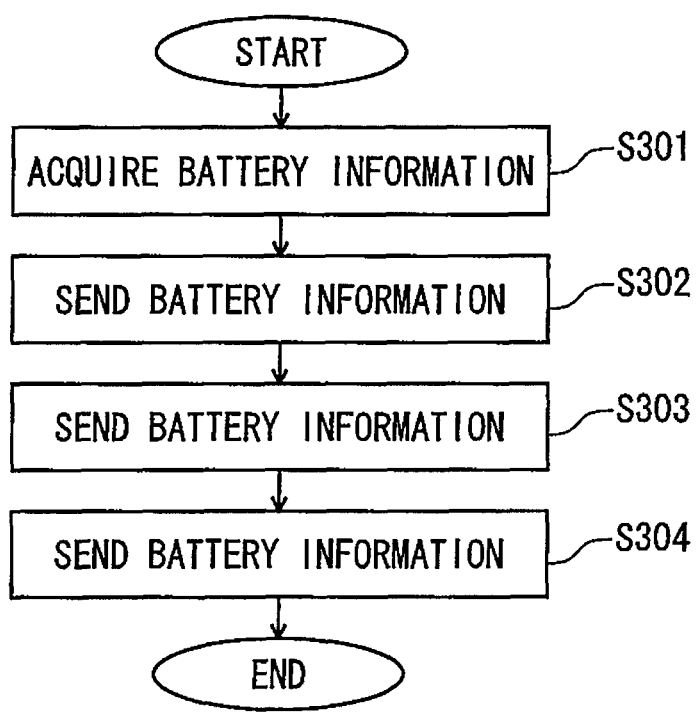
FIG. 18 is a flowchart of a process executed by the charge/discharge controller according to the first embodiment.

FIG. 18 is a flowchart of a process which is executed by the charge/discharge controller 420 according to the first embodiment.

First, at step S301, the charge/discharge controller 420 acquires battery information (rated voltage (unit: volt (V)), maximum charge/discharge currents (unit: ampere (A)), and SOC (unit: %)) and other information from the battery (BMU) 41. Then, the charge/discharge controller 420 calculates, using the SOC, chargeable/dischargeable times (unit: hour (h)) that are correlated with the SOC.

At step S302, the charge/discharge controller 420 generates a communication message containing battery information (at least includes the maximum charge/discharge currents and chargeable/dischargeable times) and sends it to the charge/discharge determining apparatus 200.

At step S303, the charge/discharge controller 420 receives, from the charge/discharge determining apparatus 200, a determination result indicating whether to charge or discharge. If instructed to charge or a discharge, the charge/discharge controller 420 performs a charging or discharge control on the battery (BMU) 41. Specifically, the charging or discharge control is a power input or output control on the battery cells.

As described above, the charge/discharge determining apparatus 200 according to the first embodiment can prevent a power failure and stabilize a power network even in the case where the natural energy power generation facility 30 is incorporated in the power network as a power supply source.

In the first embodiment, an EV system 50 can be used as a battery system 40. The EV system 50 is a battery system that is mainly for vehicular use.

Figure 19:
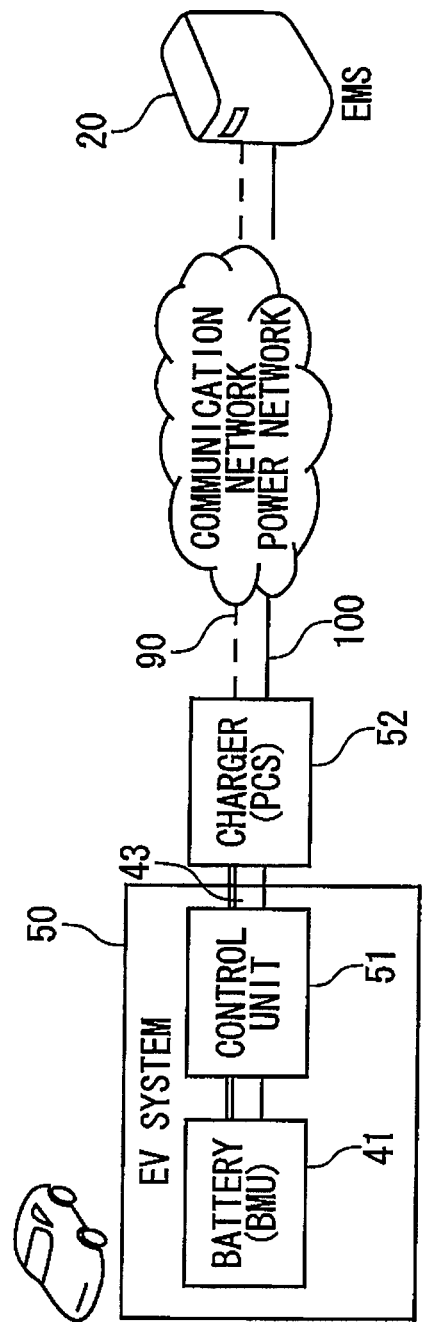
FIG. 19 is a block diagram of an EV system.

FIG. 19 shows the configuration of the EV system 50. Like the battery system 40, the EV system 50 is equipped with a battery (BMU) 41 and a control unit 51. The EV system 50 is different from the battery system 40 in that a charger (PCS) 52 is connected to the EV system 50.

The control unit 51 of the EV system 50 has different functions than the control unit 42 of the battery system 40. More specifically, unlike the control unit 42, the control unit 51 of the EV system 50 has a function of relaying a charge/discharge control and an information transfer between the battery (BMU) 41 and the charger (PCS) 52 and does not have a communication function of communicating with the EMS 20. Main functions of the control unit 42 of the battery system 40 are transferred to the charger 52. More specifically, the functions of the charge/discharge controller 420 of the control unit 42 are transferred to the charger 52. The functions of the charge/discharge controller 420 of the charger 52 are the same as those of the charge/discharge controller 420 of the control unit 42.

Alternatively, the control unit 51 of the EV system 50 may be provided with the same functions as the control unit 42 of the battery system 40. That is, the control unit 51 of the EV system 50 may be provided with the functions of the charge/discharge controller 420 of the control unit 42.

An algorithm process relating to charging/discharging of the battery (BMU) 41 can be implemented in various forms; for example, it may be concentrated in any of the control unit 51, the charger 52, the HEMS 60 in the house 110, and the EMS 20 of the power network 100. The invention can be practiced within the same framework even if the algorithm process is implemented in any of those forms.

In the first embodiment, the charge/discharge determining apparatus 200 calculates shortage or excess power based on the difference between a planned value and an actual value of supply power of the natural energy power generation facility 30 and the power plant 10. Alternatively, the charge/discharge determining apparatus 200 may calculate shortage or excess power based on the difference between a planned value and an actual value of supply power of the natural energy power generation facility 30, because a large difference between a planned value and an actual value of supply power is expected in the natural energy power generation facility 30.

In the first embodiment, the charge/discharge determining apparatus 200 instructs the power plant 10 to change the supply power and instructs the battery system 40 (or selected one of the battery systems 40) to perform charging or discharging based on the difference between a planned value and an actual value of supply power of the natural energy power generation facility 30 and the power plant 10. Alternatively, the charge/discharge determining apparatus 200 may do so based on the difference between a planned value and an actual value of electric energy that is supplied in a prescribed time rather than supply power.

In the first embodiment, a battery system 40 to perform discharging or charging is selected whose available or storable power is higher than shortage or excess power and whose dischargeable or chargeable time is longer than a delay time which is a time that it takes for the power plant 10 to change its supply power. Alternatively, a battery system 40 may be selected in the following manners. For example, a battery system 40 may be selected whose available or storable electric energy (the product of available or storable power and a dischargeable or chargeable time) is higher than shortage or excess electric energy (the product of shortage or excess power and a delay time). For another example, a battery system 40 may be selected whose dischargeable or chargeable time is longer than a delay time. This example corresponds to a case that it is known that the available or storable electric energy of that battery system 40 is higher than shortage or excess power. For a further example, plural battery systems 40 may be selected whose total available or storable power is higher than shortage or excess power. In this case, it suffices that the sum of dischargeable or chargeable times of the plural battery systems 40 be longer than a delay time.

Although the first embodiment is directed to the case that the power consumer is the house 110, a building or a factory may be a power consumer. Where a building is a power consumer, a BEMS (building energy management system) is installed in the building instead of the HEMS 60 of the house 110 and controls the power consumption in the building. Where a factory is a power consumer, an FEMS (factory energy management system) is installed in the factory and controls the power consumption in the factory.

The HEMS 60 of the house 110 may be provided with the functions of the charge/discharge determining apparatus 200. Likewise, the BEMS, the FEMS, or the smart meter 50 may be provided with the functions of the charge/discharge determining apparatus 200.

Although the first embodiment is directed to the case that the single natural energy power generation facility 30, power plant 10, and house 110 are provided, each of them may be provided in plurality.

Although the first embodiment is directed to the case that the natural energy power generation facility 30 which supplies power and the battery system(s) 40 which performs charging and discharging are located outside the house 110, the natural energy power generator 70 and the battery system 80 which are located in the house 110 may play the same roles.

Although the first embodiment is directed to the case that a single battery system 40 is selected as a battery system 40 to be instructed by the charge/discharge determining apparatus 200 (EMS 20) to perform charging or discharging, plural battery systems 40 may be selected as battery systems 40 to be instructed to perform charging or discharging simultaneously.

Although the first embodiment is directed to the case that storable/available electric energy values of a battery system 40 are calculated using a rated voltage and maximum charge/discharge currents, the invention is not limited to the case of using a rated voltage.

The charge/discharge determining apparatus 200 may be implemented by using, for example, a general-purpose computer as basic hardware. That is, the supply planning section 201, the system information acquiring section 204, the battery information acquiring section 202, the system information communicating section 206, the battery information communicating section 205, the communication section 207, and the determination section 203 may be implemented by causing a processor provided in the computer to run programs. In this case, the charge/discharge determining apparatus 200 may be implemented by either pre-installing the programs in the computer or installing, in the computer, when necessary, the programs that are stored in a storage medium such as a CD-ROM or delivered over a network.

Embodiment 2

A system according to a second embodiment is similar to the system according to the first embodiment shown in FIG. 1 or 3. The configurations of a charge/discharge determining apparatus 200A and a charge/discharge controller 420A are similar to those of the charge/discharge determining apparatus 200 (see FIG. 10) and the charge/discharge controller 420 (see FIG. 13) according to the first embodiment.

The charge/discharge determining apparatus 200A and the charge/discharge controller 420A according to the second embodiment are different in part of the functions from the charge/discharge determining apparatus 200 and the charge/discharge controller 420 according to the first embodiment. The different functions will mainly be described below.

The charge/discharge determining apparatus 200A (EMS 20A) according to the second embodiment selects a battery system 40 to perform discharging or charging taking into consideration battery lifetimes of the respective battery systems 40 in addition to the determination criteria used in the charge/discharge determining apparatus 200 according to the first embodiment (involving available or storable electric energy values of the respective battery systems 40 (compared with shortage or excess electric energy)).

A method for selecting a battery system 40 taking lifetime elongation of the battery systems 40 into consideration will be described below.

In general, the lifetime of a battery system 40 can be elongated by performing charge/discharge controls on it within its optimum charging factor (SOC) range (between a lower limit α% and an upper limit β%) instead of charging the battery cells of the battery (BMU) 41 completely (SOC is 100%) or discharging them completely (SOC is 0%).

In view of the above, in the second embodiment, a battery system 40 whose charging factor remains within the optimum range after its charging or discharge is selected as a battery system 40 to perform charging or discharging.

For example, when receiving a communication message containing battery information (see FIG. 11), the charge/discharge determining apparatus 200A calculates a predicted charging factor after charging or a discharge based on a rated capacity, a rated voltage, maximum charge/discharge currents, and a current charging factor of each battery system 40 in addition to shortage or excess electric energy. The charge/discharge determining apparatus 200A acquires an optimum charging factor range of each battery system 40 and selects a battery system 40 whose predicted charging factor is within the optimum charging factor range as a battery system 40 to perform charging or discharging. It is noted that each battery system 40 has a unique optimum charging factor range.

FIG. 20 shows an example communication message which is sent from each battery system 40 to the charge/discharge determining apparatus 200A and indicates an optimum charging factor range. The communication message shown in FIG. 20 includes a TCP/IP header, an identifier, an upper limit optimum charging factor (unit: %), and a lower limit optimum charging factor (unit: %). The upper limit optimum charging factor and the lower limit optimum charging factor corresponding to β% and α% shown in FIG. 21 (described later), respectively. The communication message shown in FIG. 20 may either be separate from the communication message shown in FIG. 11 or be combined with the latter into a single message.

The optimum charging factor range will be described below with reference to FIG. 21.

Figure 21:
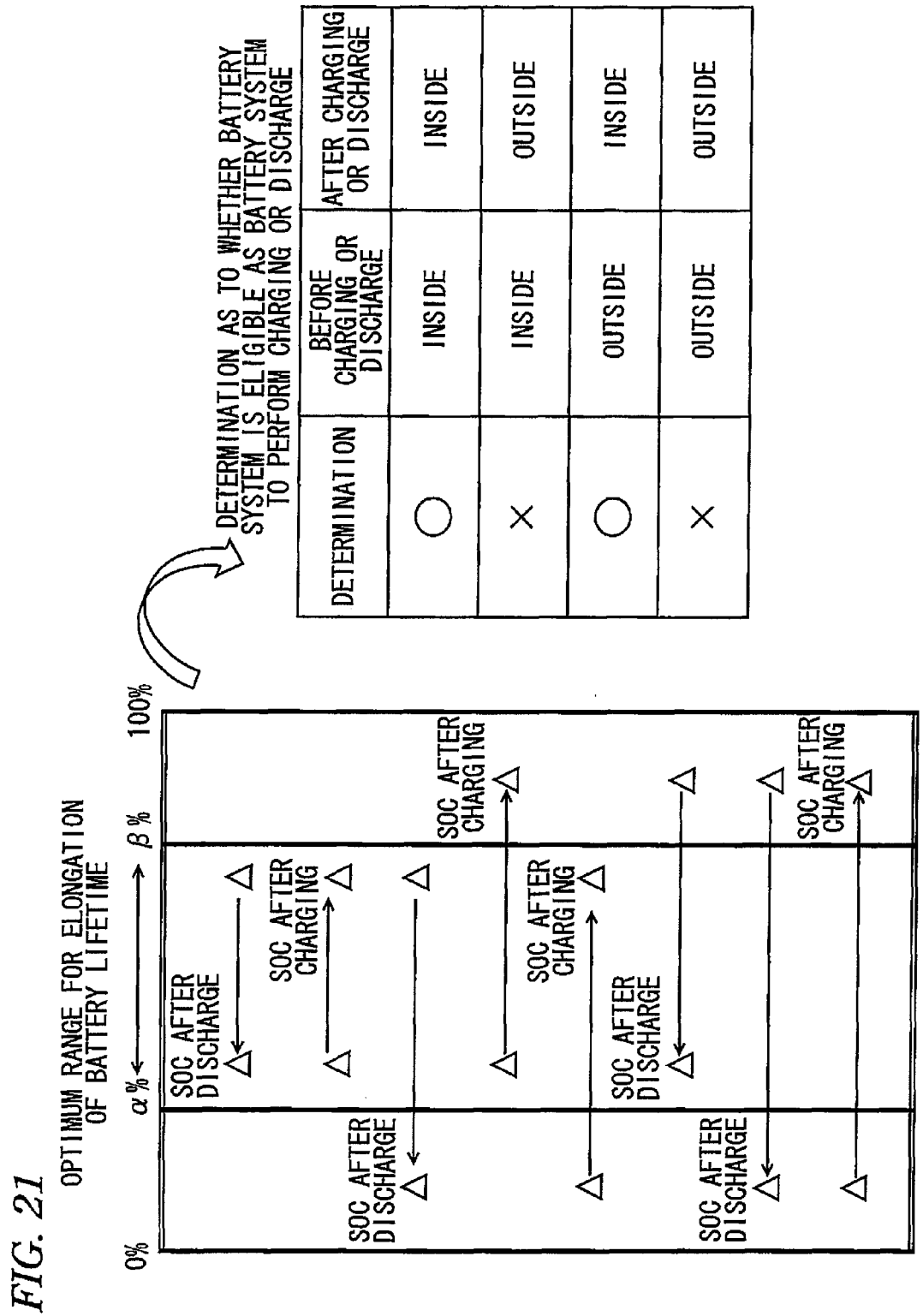
FIG. 21 shows a relationship between the charging factors before and after charging or a discharge of a battery system and its eligibility as a battery system to perform charging or a discharge in the second embodiment.

FIG. 21 shows a relationship between the charging factors before and after charging or a discharge of a battery system 40 and its eligibility as a battery system 40 to perform charging or a discharge.

In the example of FIG. 21, the upper limit and the lower limit of an optimum charging factor range are β% and α%, respectively. As shown in FIG. 21, a battery system 40 is eligible as a battery system 40 to perform charging or a discharge irrespective of its charging factor before charging or a discharge if its predicted charging factor (SOC) after charging or a discharge is within the optimum charging factor range.

Figure 22:
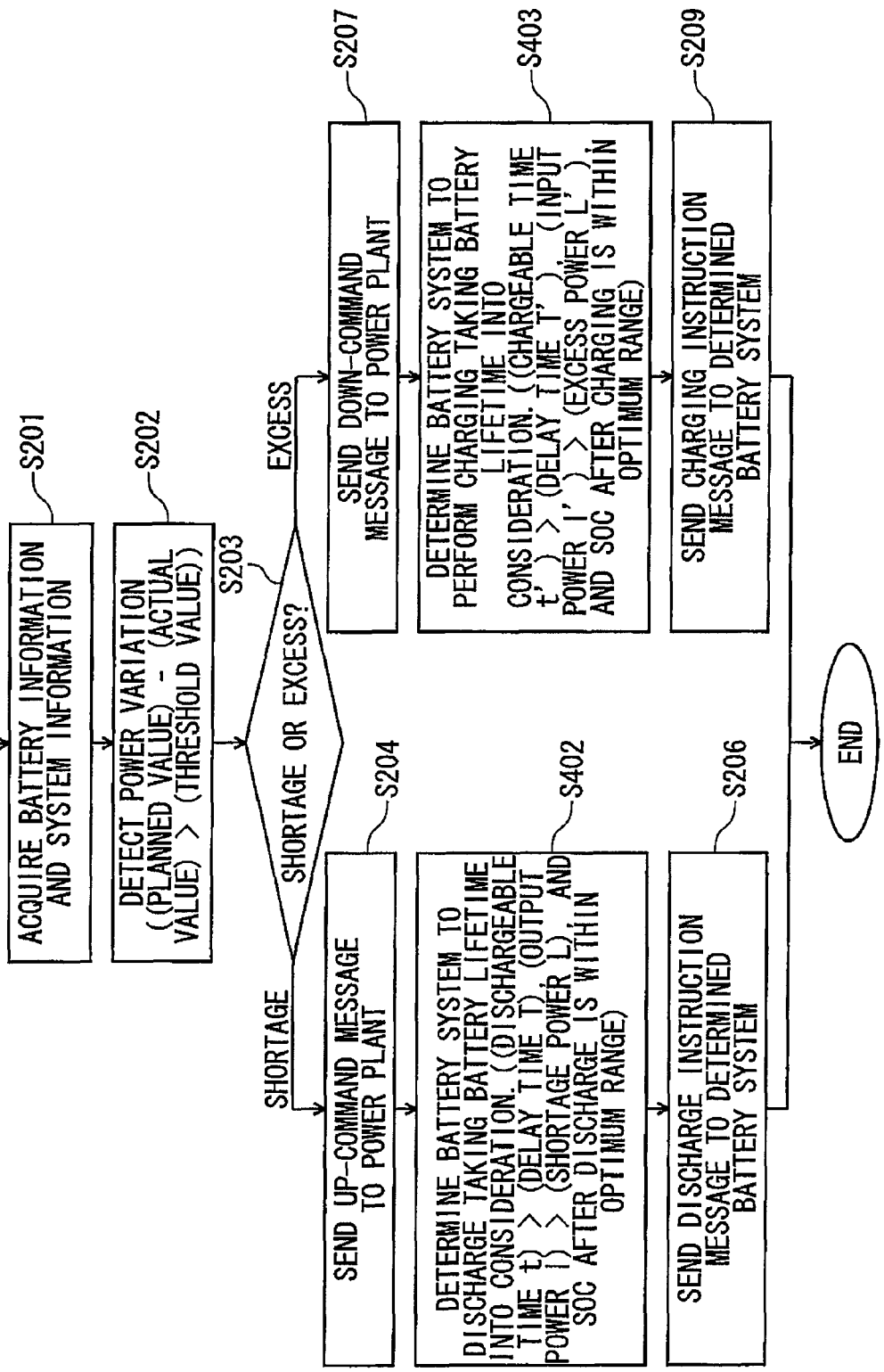
FIG. 22 is a flowchart of a process executed by the charge/discharge determining apparatus according to the second embodiment.

FIG. 22 is a flowchart of a process executed by the charge/discharge determining apparatus 200A (EMS 20A) according to the second embodiment. In FIG. 22, the same steps as shown in FIG. 17 are given the same reference symbols as the latter.

At step S401, as in step S201 of the process according to the first embodiment, the charge/discharge determining apparatus 200A acquires battery information and system information. At step S401, the charge/discharge determining apparatus 200A acquires an optimum charging factor range of each battery system 40 as part of the battery information.

At step S402, as in step S205 of the process according to the first embodiment, the charge/discharge determining apparatus 200A determines a battery system 40 to discharge. Step S402 is the same as step S205 in that the charge/discharge determining apparatus 200A determines, as a battery system 40 to discharge, a battery system 40 whose dischargeable time is longer than the delay time and whose output power is higher than the shortage power. At step S402 of the second embodiment, the charge/discharge determining apparatus 200 also determines whether or not the predicted charging factor of each battery system 40 is within the optimum charging factor range. The charge/discharge determining apparatus 200A determines, as a battery system 40 to discharge, a battery system 40 that satisfies all of the above conditions.

FIG. 23 shows whether charging factors before and after a discharge of each of the battery systems 40A, 40B, and 40C of the system shown in FIG. 3 are within its optimum changing factor range. In the example of FIG. 23, the post-discharge charging factor (predicted charging factor) of the battery system 40A is within the optimum changing factor range and the battery system 40A is selected as a battery system 40 to discharge.

Step S403 is similar to step S402 in that in determining a battery system 40 to perform charging by not only checking a chargeable time and storable power of each battery system 40 but also determining whether or not a predicted charging factor of each battery system 40 is within its optimum charging factor range. The other steps are the same as in the process of FIG. 17 and will not be described in detail.

In general, the initial cost of stationary battery systems is high. It is therefore preferable to avoid frequent replacement of stationary battery systems because of exhaustion. According to the charge/discharge determining apparatus 200A of the second embodiment, the lifetime of the battery (BMU) 41 of each battery system 40 can be elongated and hence its time of replacement can be delayed. As a result, the running cost of the power infrastructure from the power network 90 to the house 110 can be reduced.

(Modification)

In a modification of the second embodiment of the invention, a battery system 40' calculates, based on an optimum charging factor range, storable/available power values and chargeable/dischargeable times in such a manner that the charging factor is kept within the optimum range.

For example, where the current charging factor of a battery system 40' is 50% and the upper limit and lower limit of its optimum charging factor range is 80% and 20%, respectively, the battery system 40' corrects, in the following manner, battery information to be sent to the charge/discharge determining apparatus 200 (EMS 20). In the first embodiment, the battery system 40 informs the charge/discharge determining apparatus 200 (EMS 20) of storable/available power values and chargeable/dischargeable times that correspond to complete charge/discharge of 50%. In contrast, in the modification of the second embodiment, the battery system 40' informs the charge/discharge determining apparatus 200 (EMS 20) of storable power and a chargeable time that correspond to charging of 30% which is the difference between the current charging factor and the upper limit 80% of the optimum charging factor range and storable power and a dischargeable time that correspond to a discharge of 30% which is the difference between the current charging factor and the lower limit 20% of the optimum charging factor range. FIG. 24 shows an example communication message containing battery information which is sent from each battery system 40' used in the modification.

The charge/discharge determining apparatus 200 can determine a battery system 40' to perform charging or discharging by operating in the same manner as in the first embodiment except that it acquires, from each charge/discharge controller 420, storable/available power values and chargeable/dischargeable times that are corrected taking an optimum charging factor range into consideration.

In the modification storable/available power values and chargeable/dischargeable times as corrected taking an optimum charging factor range into consideration is sent as battery information, but storable/available electric energy values as corrected taking an optimum charging factor range into consideration may be sent as battery information. Also in this case, the charge/discharge determining apparatus 200 can determine a battery system 40' to perform charging or discharging by operating in the same manner as in the first embodiment except that it acquires, from each charge/discharge controller 420, storable/available electric energy values as corrected taking an optimum charging factor range into consideration.

Embodiment 3

A system according to a third embodiment is similar to the system according to the first embodiment shown in FIG. 1 or 3. The configurations of a charge/discharge determining apparatus 200B and a charge/discharge controller 420B are similar to those of the charge/discharge determining apparatus 200 (see FIG. 10) and the charge/discharge controller 420 (see FIG. 13) according to the first embodiment.

The charge/discharge determining apparatus 200B and the charge/discharge controller 420B according to the third embodiment are different in part of the functions from the charge/discharge determining apparatus 200 and the charge/discharge controller 420 according to the first embodiment. The different functions will mainly be described below.

The charge/discharge determining apparatus 200B (EMS 20B) according to the third embodiment selects a battery system 40 to perform discharging or charging taking into consideration battery lifetimes of the respective battery systems 40 in addition to the determination criteria used in the charge/discharge determining apparatus 200 according to the first embodiment (involving available or storable electric energy values of the respective battery systems 40 (compared with shortage or excess electric energy)).

A method for selecting a battery system 40 taking lifetime elongation of the battery systems 40 into consideration will be described below.

In the third embodiment, to elongate the lifetimes of the battery systems 40, the charge/discharge determining apparatus 200B determines a battery system 40 to perform charging or discharging based on the numbers of times of charging and discharging done actually of the respective battery systems 40 and upper limits of optimum ranges, for lifetime elongation, of the number of times of charging and discharging of the respective battery systems 40.

A lifetime number of times of charging and discharging which is an upper limit (possible) number of times of charging and discharging is prescribed for the battery 41 of each battery system 40 depending on its type.

Therefore, from the viewpoint of lifetime elongation, it is desirable to select a battery system 40 whose difference between the number of times of charging and discharging done so far and the lifetime number of times of charging and discharging is as large as possible.

In the third embodiment, an upper limit of an optimum range of the number of times of charging and discharging is set to a number that is smaller than a lifetime number of times of charging and discharging of each battery system 40 according to the lifetime number of times of charging and discharging. For example, if the lifetime number of times of charging and discharging of a certain battery system 40 is 8,000, the upper limit of an optimum range, for lifetime elongation, of the number of times of charging and discharging is set at 5,000.

A battery system 40 is eligible as a battery system 40 to perform charging or a discharge if the number of times of charging and discharging done so far is within the upper limit of the optimum range of the number of times of charging and discharging. For example, where the upper limit of the optimum range of the number of times of charging and discharging is 5,000, a battery system 40 is prohibited from performing charging or discharging if the number of times of charging and discharging done so far is 6,000 and is allowed to perform charging or discharging if the number of times of charging and discharging done so far is 4,000.

According to the charge/discharge determining apparatus 200B of the third embodiment, the lifetime of the battery (BMU) 41 of each battery system 40 can be elongated and hence its time of replacement can be delayed. As a result, the running cost of the power infrastructure from the power network 90 to the house 110 can be reduced.

Although the several embodiments of the invention have been described above, they are just examples and should not be construed as restricting the scope of the invention. Each of these novel embodiments may be practiced in other various forms, and part of it may be omitted, replaced by other elements, or changed in various manners without departing from the spirit and scope of the invention. These modifications are also included in the invention as claimed and its equivalents.

As described above, the invention makes it possible to provide a charge/discharge determining apparatus capable of stabilizing a power network in the case where natural energy is incorporated in the power network as a power supply source. More specifically, a battery to perform charging or discharging can be determined properly and occurrence of a power failure in a power network can be prevented.

What is claimed is:

1. A charge/discharge determining apparatus for managing a natural energy power generation facility, a power plant and a plurality of batteries in an electrical power system, the apparatus comprising:
   a system information acquiring section configured to acquire an actual value of natural energy power that is supplied from the natural energy power generation facility to the electrical power system;
   a battery information acquiring section configured to acquire battery electric energy information from the respective batteries, wherein the battery electric energy information indicates charge/discharge electric energies of the respective batteries which can be discharged from or charged in the respective batteries; and
   a determining section configured to determine at least one battery to be charged/discharged from among the plurality of batteries, wherein when an absolute value of a difference between the actual value and a predicted value of the natural energy power is larger than a threshold value, the determining section is configured to:
   (a) instruct the power plant to change plant power that is supplied from the power plant to the electrical power system;
   (b) compare excess or shortage electric energy that is calculated from a delay time required for changing the plant power and the difference between the actual value and the predicted value of the natural energy power, with the charge/discharge electric energies of the respective batteries;
   (c) select at least one battery having a charge/discharge electric energy that is larger than the excess or shortage electric energy; and
   (d) determine the selected battery as a battery to be charged/discharged.

2. The apparatus according to claim 1, wherein
   the battery electric energy information includes voltage information, current information, and charge/discharge times of the respective batteries.

3. The apparatus according to claim 2, wherein:
   the voltage information are rated voltages of the respective batteries;
   the current information are maximum charge/discharge currents of the respective batteries; and
   the charge/discharge times are correlated with charging factors of the respective batteries.

4. The apparatus according to claim 1, wherein the battery electric energy information includes the charge/discharge electric energies and charge/discharge times of the respective batteries.

5. The apparatus according to claim 1, wherein when the absolute value of the difference between the actual value and the predicted value is larger than the threshold value, and the determining section detects a power shortage from the difference between the actual value and the predicted value, the determining section is configured to:
   (b-1) compare the shortage electric power with a discharge electric energy that is calculated based on the battery electric energy information of the respective batteries; and
   (c-1) select at least one battery having a discharge electric energy that is larger than the shortage electric power; and
   (d-1) determine the selected battery as a battery to be discharged.

6. The apparatus according to claim 1, wherein when the absolute value of the difference between the actual value and the predicted value is larger than the threshold value, and the determining section detects a power excess from the difference between the actual value and the predicted value, the determining section is configured to:
   (b-2) compare the excess electric power with a charge electric energy that is calculated based on battery electric energy information of the respective batteries;
   (c-2) select at least one battery having a charge electric energy that is larger than the excess electric power; and
   (d-2) determine the selected battery as a battery to be charged.

7. The apparatus according to claim 1, wherein the determining section is configured to select at least one battery having both of
   a charge/discharge electric energy that is larger than the excess or shortage electric energy; and
   a charge/discharge time that is longer than the delay time.

8. The apparatus according to claim 1, wherein
   the battery information acquiring section is configured to further acquire optimum charging factor ranges for battery lifetime elongation of the respective batteries, from the respective batteries, and
   wherein the determining section is configured to:
   (c-3) select at least one battery having a charge/discharge electric energy that is larger than the excess or shortage electric energy and whose charging factor is within the optimum charging factor range even after charge of the excess electric energy or discharge of the shortage electric energy.

9. The apparatus according to claim 1, wherein
   the battery information acquiring section is configured to further acquire upper limit numbers of times of charge/discharge of the respective batteries in view of battery lifetime elongation, from the respective batteries,
   wherein the determining section is configured to:
   (c-4) select at least one battery having a charge/discharge electric energy that is larger than the excess or shortage electric energy and whose numbers of times of charge/discharge is smaller than the upper limit numbers of times of charge/discharge.

10. The apparatus according to claim 1, wherein the battery information acquiring section is configured to acquire, from the plural respective batteries, battery electric energy information which enable determination of charge/discharge electric energy values of the respective batteries with which predicted charging factors which are charging factors after charge of the charge electric energy values or discharge of the discharge electric energy values are within optimum charging factor ranges, for battery lifetime elongation, of the respective batteries.

11. A non-transitory computer readable medium storing a program causing a computer to execute a charge/discharge determining operation for managing a natural energy power generation facility, a power plant and a plurality of batteries in an electrical power system, the operation comprising
  (a) acquiring an actual value of natural energy power that is supplied from the natural energy power generation facility to the electrical power system;
  (b) acquiring battery electric energy information from the respective batteries, wherein the battery electric energy information indicates charge/discharge electric energies of the respective batteries which can be discharged from or charged in the respective batteries; and
  (c) determining at least one battery to be charged/discharged from among the plurality of batteries, wherein when an absolute value of a difference between the actual value and a predicted value of the natural energy power is larger than a threshold value, the step (c) comprising:
  (c-1) instructing the power plant to change plant power that is supplied from the power plant to the electrical power system;
  (c-2) comparing excess or shortage electric energy that is calculated from a delay time required for changing the plant power and the difference between the actual value and the predicted value of the natural energy power, with the charge/discharge electric energies of the respective batteries;
  (c-3) selecting at least one battery having a charge/discharge electric energy that is larger than the excess or shortage electric energy; and
  (c-4) determining the selected battery as a battery to be charged/discharged.

\* \* \* \* \*